United States Patent [19]

Ikeyama et al.

[11] Patent Number: 5,696,049
[45] Date of Patent: Dec. 9, 1997

[54] CATALYST FOR THE DECOMPOSITION OF NITROGEN OXIDES AND A METHOD FOR DENITRIFICATION USING THE SAME

[75] Inventors: Nobuhide Ikeyama; Yutaka Iwanaga; Yuji Torikai; Masatosi Adachi, all of Fukuoka-ken, Japan

[73] Assignee: Mitsui Mining Co., Ltd., Tokyo, Japan

[21] Appl. No.: 343,490

[22] PCT Filed: Mar. 24, 1994

[86] PCT No.: PCT/JP94/00474

§ 371 Date: Feb. 2, 1995

§ 102(e) Date: Feb. 2, 1995

[87] PCT Pub. No.: WO94/21373

PCT Pub. Date: Sep. 29, 1994

[30] Foreign Application Priority Data

Mar. 25, 1993 [JP] Japan ................ 5-089479

[51] Int. Cl.$^6$ ................ B01J 23/22; B01J 21/06
[52] U.S. Cl. ................ 502/350; 502/353; 423/329
[58] Field of Search ................ 502/350, 353; 423/329

[56] References Cited

U.S. PATENT DOCUMENTS

| | | | |
|---|---|---|---|
| 4,833,113 | 5/1989 | Imanari et al. | 502/309 |
| 4,929,586 | 5/1990 | Hegedus et al. | 502/217 |
| 4,975,256 | 12/1990 | Hegedus et al. | 423/239 |
| 4,977,127 | 12/1990 | Rikimaru | 502/309 |

FOREIGN PATENT DOCUMENTS

| | | |
|---|---|---|
| 0256359 | 2/1988 | European Pat. Off. . |
| 0317293 | 5/1989 | European Pat. Off. . |
| 3730283 | 3/1989 | Germany . |

*Primary Examiner*—Glenn A. Caldarola
*Assistant Examiner*—Alexander G. Ghyka
*Attorney, Agent, or Firm*—Wenderoth, Lind & Ponack

[57] ABSTRACT

The present invention aims at providing a novel NOx-decomposing catalyst and a denitrification method using the same. The feature thereof consists in an NOx-decomposing catalyst, in which vanadium oxide is supported on titanium oxide of anatase type, having a specific surface area of 100 to 250 m$^2$/g and micro pores of 15 to 25 Å in pore diameter and 75 to 85 Å in pore diameter respectively in an amount of at least 0.05 cc/g, and a method for the denitrification of a waste gas comprising contacting an NOx-containing waste gas with the above described catalyst in the presence of a reducing gas at a temperature of 100° to 350° C. An NOx-containing waste gas with coexistent catalyst-poisonous materials such as water, SOx, etc. can be treated in an effective manner at a relatively low temperature, e.g. 170° C. or lower, at which no practical treatment can be carried out by the prior art method, without formation of N$_2$O as a by-product.

11 Claims, 2 Drawing Sheets

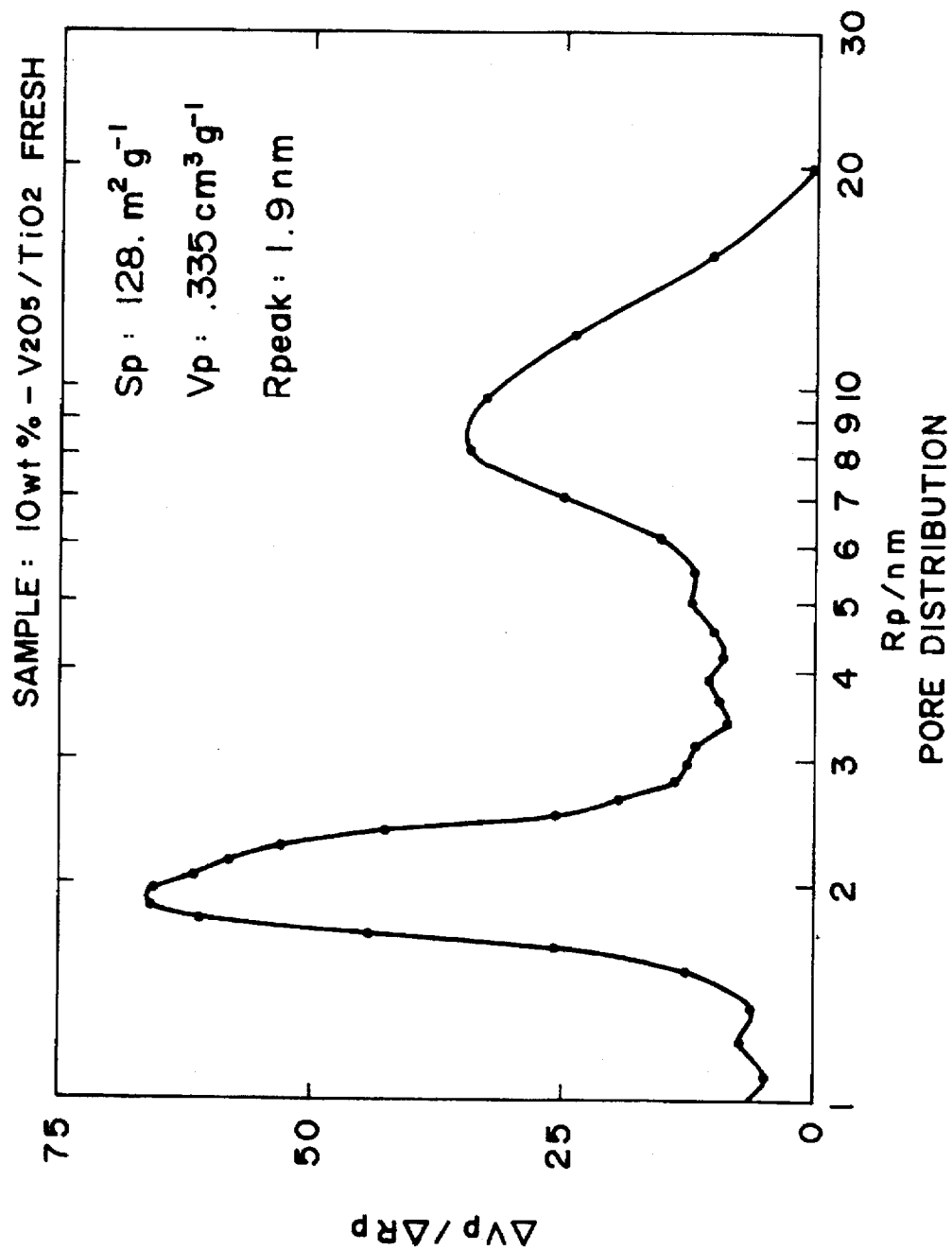

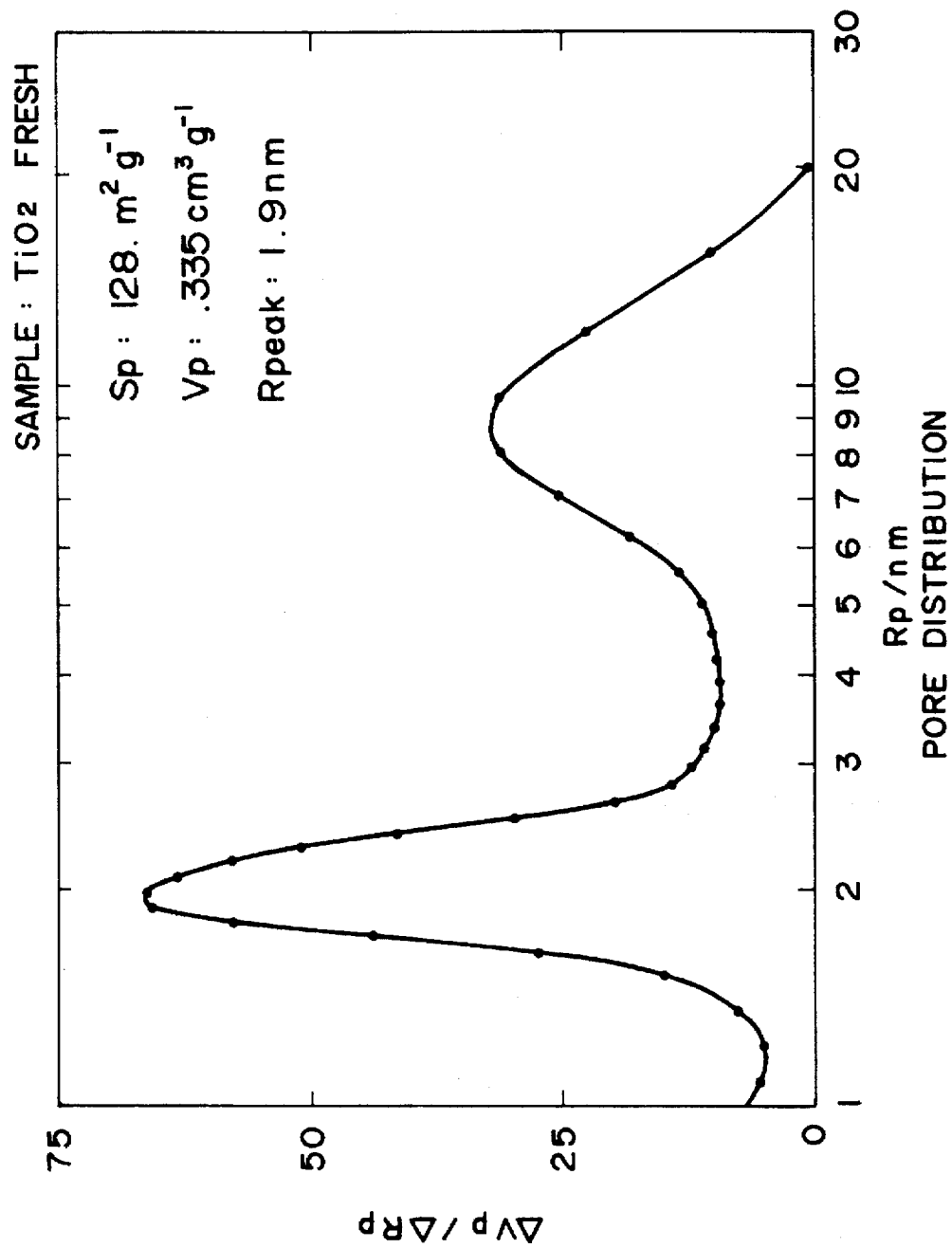

CATALYST FOR THE DECOMPOSITION OF NITROGEN OXIDES AND A METHOD FOR DENITRIFICATION USING THE SAME

TECHNICAL FIELD

This invention relates to a catalyst for the decomposition of nitrogen oxides contained in a waste gas, etc., in particular, a catalyst of titanium oxide-vanadium type for the decomposition of nitrogen oxides, having a high denitrification activity at a relatively low temperature, and a method for denitrification using the catalyst.

BACKGROUND TECHNIQUES

Waste gases formed by combustion of various fossil fuels contain nitrogen oxides (hereinafter referred to as "NOx"), resulting in one cause of air pollution. NOx includes NO, $NO_2$, $N_2O_3$, $N_2O_4$, $N_2O$, etc. and the most part of NOx contained in waste gases formed by combustion of various fossil fuels such as petroleums, coals, etc. is NO. A number of proposals have been made as a method of treating NOx in waste gases. In the so-called catalytic reduction denitrification method comprising contacting a waste gas with a catalyst in the presence of ammonia ($NH_3$) as a reducing agent to reduce and decompose NOx in the waste gas to $N_2$ and to render it harmless, the reduction and decomposition of NOx selectively proceed even in the co-existence of oxygen. This is an effective method as a waste gas denitrification method.

As a catalyst for advancing such reduction and decomposition of NOx, a number of catalysts have been proposed, one of which is a titanium oxide-vanadium type catalyst. For example, Japanese Patent Laid-Open Publication No. 51966/1975(Japanese Patent Publication No. 2912/1979) discloses a method comprising contacting nitrogen oxides with a catalyst comprising vanadium supported on titanium oxide in the presence of ammonia at a temperature of 150° to 650° C. and thereby decomposing the nitrogen oxides into nitrogen and water. The catalyst used in this method has excellent properties, for example, a very high activity for the reduction reaction of NOx at a high temperature, e.g. at least 170° C. In this case, the temperature at which NOx is contacted with the catalyst is in the range of 150° to 650° C., but the specific surface area of the catalyst comprising vanadium supported on titanium oxide is ordinarily at most about 50 $m^2/g$ and the denitrification activity is markedly lowered at a reaction temperature of at most 170° C. to largely lower the decomposition capacity of NOx.

As described above, catalyst comprising vanadium supported on titanium oxide has hitherto been proposed, but the catalyst of this type has the problem that a practically high denitrification capacity is hardly obtained unless a waste gas is contacted with the catalyst at a temperature of 200° to 500° C. In the case of using the catalyst, furthermore, there arises a problem that $N_2O$ regarded as a causal material for breaking the ozone layer and warming the earth is by-produced in a proportion of 5 to 10% based on NOx, thus resulting in possibility of the secondary pollution.

In the titanium oxide-vanadium type catalyst, a catalyst having a relatively high specific surface area and specified pore ratio has been proposed. In Japanese Patent Laid-Open Publication No. 86845/1990, for example, a catalyst for denitrification is disclosed in which a metal oxide catalytic component such as vanadium pentoxide is deposited on anatase-type titania as a support. In this catalyst, the pore distribution of the anatase-type titania used as a support is controlled in such a manner that the porosity of pores (pores of at most 60 nm in diameter) is in the range of 0.05 to 0.5 cc/cc, the porosity of macro pores (pores of at least 60 nm in diameter) is in the range of 0.05 to 0.5 cc/cc and the total porosity is at most 0.80 cc/cc to raise the denitrification property. Furthermore, Japanese Patent Laid-Open Publication No. 130140/1985 discloses a catalyst for the denitrification of a waste gas comprising titanium oxide, tungsten oxide and vanadium oxide as catalytic active components and having a specific surface area of 80 to 200 $m^2/g$, pore volume of 0.1 to 0.5 cc/g and micro pores of at most 10 nm in diameter and macro pores of 10 to $10^4$ nm in diameter.

In these catalysts, however, the contacting temperature is practically adjusted to at least 200° C. so as to attain a high denitrification property and if the contacting temperature is lower than this range, the catalytic effect is insufficient, for example, as shown by low denitrification property, by-products of $N_2O$, etc.

In Japanese Patent Laid-Open Publication No. 200741/1992, there is proposed a catalyst comprising vanadium supported on titanium oxide of anatase type, having a specific surface area of about 150 $m^2/g$. This catalyst aims at adsorbing and removing nitrogen oxides, for example, contained in a ventilation gas of a tunnel with a relatively low concentration, e.g. about 5 ppm through contact with the gas at a raised temperature, and is conceptionally different from catalysts used for catalytic decomposition. This catalyst is considered to be given a high specific surface area for the purpose of improving its capacity because of being used for the adsorption and removal of nitrogen oxide and has a relatively good denitrification property as a catalyst for the denitrification of a waste gas at a relatively low temperature, e.g. 170° C. or lower, but the catalytic effect is insufficient, for example, as shown by secondary products such as $N_2O$, etc.

Waste gases needing removal of NOx include waste gases at a relatively high temperature, e.g. of 200° to 450° C. and at a relatively low temperature, e.g. of at most 170° C. Up to the present time, when a waste gas at a low temperature is processed as in the latter case, there has been used a method comprising raising the temperature of the waste gas to about 200° C. and then subjecting NOx to reduction and decomposition with a reducing agent such as $NH_3$, etc. in the presence of the above described denitrification catalyst. For the treatment of a waste gas at a low temperature, however, it has been desired to develop a catalyst having a high activity for the NOx reducing reaction without formation of $N_2O$ as a by-product, since raising the temperature of the waste gas in a large amount is useless in respect of energy cost.

It is an object of the present invention to provide a NOx decomposition catalyst capable of reacting at a relatively low temperature and treating a NOx-containing waste gas with coexistent catalyst-poisonous materials such as water, SOx, etc. and a denitrification method using the same, whereby the above described problems of the prior art can be solved.

DISCLOSURE OF PRESENT INVENTION

The present invention provides a catalyst for the decomposition of nitrogen oxides in which vanadium oxide is supported on titanium oxide of anatase type, having a specific surface area of 100 to 250 $m^2/g$ and micro pores of 1.5 to 2.5 nm in pore diameter and 7.5 to 8.5 nm in pore diameter respectively in a pore volume of at least 0.05 cc/g, and a method for the denitrification of a nitrogen oxide-containing waste gas comprising contacting a nitrogen oxide-containing waste gas with the above described catalyst in the presence of a reducing gas at a temperature of 100° to 350° C.

BRIEF DESCRIPTION OF DRAWINGS

FIG. 1 is an example of a pore distribution graph of the catalyst of the present invention comprising 10% by weight of vanadium oxide supported on a titanium oxide support of anatase type (Catalyst B).

FIG. 2 is an example of a pore distribution graph of the titanium oxide support of anatase type used in the case of FIG. 1.

In these figures, the marks have the following meanings:

$R_P$: pore diameter (nm)

$V_P$: pore volume (cm³/g), $\Delta V_P/\Delta R_P$: change rate of pore volume (change of pore volume with change of pore diameter)

$S_P$: specific surface area (m₂/g)

$R_{PEAK}$: pore diameter with maximum peak present

BEST EMBODIMENT FOR CARRYING OUT PRESENT INVENTION

The feature of the present invention consists in the use of titanium oxide of anatase type, having a specific surface area of 100 to 250 m²/g and micro pores of 1.5 to 2.5 nm in pore diameter and 7.5 to 8.5 nm in pore diameter respectively in a pore volume of at least 0.05 cc/g.

It is not clearly understood why the catalyst comprising the active component on the support having the micro pores with such a pore diameter distribution has excellent properties as a catalyst for the decomposition reaction of NOx. However, it can be assumed that the micro pores of 7.5 to 8.5 nm in pore diameter play a role of attracting substrate gases such as $NH_3$, NO, $O_2$, etc. to the surface of the catalyst with a suitable strength and the decomposition reaction proceeds on the micro pores of 1.5 to 2.5 nm in pore diameter.

In the catalytic reducing denitrification method comprising reducing and decomposing NOx in a waste gas into $N_2$ through the contact with the catalyst in the presence of ammonia ($NH_3$), the reaction proceeds, for example, in the case of NO, by the following equation:

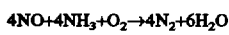

Since micro pores of about 2 nm in pore diameter are present in such a state that the substrate gases readily enter and adsorption of $NH_3$ tends to readily occur like in an electrostatic field (such that electric charges are localized), the reactivity of the substrate gases on the micro pore surfaces and in the micro pores is so high that the reaction is accelerated.

When the micro pore diameter is smaller than 1.5 nm, diffusion-controlling of a gas takes place, it is hard for the substrate gases to enter the micro pores and the concentration of the substrate gases is largely decreased, so that the reaction rate is markedly lowered. On the other hand, when the pore diameter exceeds 2.5 nm, there is no problem on the diffusion-controlling, but the localization of electric charges is weakened and the reaction rate is lowered.

Micro pores of about 8 nm in diameter effectively function to introduce the substrate gases into micro pores of about 2 nm in diameter. Namely, the micro pores of about 8 nm in pore diameter have an adsorptivity with such a suitable degree that is not too strong, nor too weak for the substrate gases, and accordingly, the substrate gases adsorbed on the micro pores of about 8 nm in pore diameter are moved to the micro pores of about 2 nm in diameter by spillover or surface diffusion, where the reactions thereof take place.

As described above, the micro pores of about 8 nm in pore diameter have an effect of electrostatically increasing the concentration of the substrate gases on the surface of the micro pores or in the micro pores to accelerate the reaction of the substrate gases.

When the micro pore diameter is smaller than 7.5 nm, the electrostatic field gets stronger, the spillover or surface diffusion of the substrate gases to the micro pores of about 2 nm in diameter as a reaction site, is hard to occur and supply of the substrate gases to the micro pores of about 2 nm in diameter is not sufficient, resulting in lowering of the reaction rate.

When the micro pore diameter is larger than 8.5 nm, the electrostatic field for the substrate gases is too weak to sufficiently supply the substrate gases to the micro pores of about 2 nm in diameter and the concentration of the substrate gases to be reacted is lowered to decrease the reaction rate.

Generally, it is said that the pore distribution of titanium oxide depends on the production process thereof. FIG. 1 shows a measured result of the pore distribution of the catalyst used in the present invention (Example 2, Catalyst No. B) and FIG. 2 shows a measured result of the pore distribution of titanium oxide used as a support during the same time. Herein, the pore distribution is measured by the Cranston Inkley Method (CI Method) using a BET apparatus and carbon black (pore=0) as a reference.

The pore distribution of the catalyst is not so different from that of titanium oxide used as a support and is substantially determined by the pore distribution of the support. The specific surface area of the catalyst of the prior art using titanium oxide as a support is ordinarily in the range of at most 50 m²/g or at least 100 m²/g. The specific surface area of the support used in the present invention is larger, i.e. in the range of 100 to 250 m²/g and is characterized by the specified range. This means the pore volume of the whole support is enlarged by the use of one having the larger specific surface area.

The support used for the catalyst of the present invention can be produced in an analogous manner to the Ordinary process for the production of titanium oxide of anatase type, but it is required to select suitable reaction conditions so as to adjust the specific surface area and pore distribution to the above described specified range.

When titanyl sulfate is used as a raw material, hydrolyzed in an aqueous solution to form titanium oxide hydrate and calcined to form a support of titanium oxide of anatase type, for example, the titanium oxide of anatase type having a specific surface area and pore distribution in the above described specified range can be obtained by carrying out the reactions under reaction conditions of a hydrolyzing temperature of 80° to 120° C., preferably 90° to 110° C., hydrolyzing time of 0.5 to 25 hours, preferably 1 to 20 hours, calcining temperature of 300° to 500° C. and calcining time of 1 to 5 hours, preferably 1 to 2 hours, in suitable combination. The relationship of the hydrolysis temperature and time is such that when the hydrolysis is carried out at a higher temperature, the time is shortened and when the hydrolysis is carried out at a lower temperature, the time is lengthened. Even when the reaction conditions are in the above described ranges, the specific surface area and pore distribution of a support obtained are sometimes outside the scope of the present invention depending upon the combination of the processing conditions. In the hydrolysis, for example, when the hydrolysis is carried out at a lower temperature (80° C.) for a shorter time (at most 15 hours) in a combination of the temperature and time, pores cannot be developed, and when the hydrolysis is carried out at a higher temperature (110° C.) for a shorter time (at least 5 hours), the pores and pore volume are decreased. When the calcining temperature of a support is higher, the pore volume is decreased. Even when such a support is used, a catalyst having excellent capacities cannot be obtained.

The catalyst of the present invention is a catalyst obtained by supporting vanadium oxide as a catalytic active component on titanium oxide of anatase type having micro pores with the above described pore distribution as a support.

The shape, size, etc. of the catalyst can suitably be selected depending on the use object and use conditions, and any shapes of tablets, straw bags, spheres, rings, columns, plates, honeycombs, etc. or any sizes can be applied, but shapes of honeycombs and plates are particularly preferred in view of the contact efficiency with gases and the pressure loss.

A method of supporting vanadium oxide is not particularly limited, but a preferred method is exemplified as follows: Vanadium oxide is optionally mixed with a binder component such as colloidal silica, colloidal titania, colloidal alumina, etc., to which water is added, followed by kneading. The resulting mixture is further mixed with titanium oxide as a support, shaped in a suitable size and optionally pulverized to control the particle size. Furthermore, there is another method comprising adding water to a mixture of vanadium oxide optionally mixed with the above described binder component to form a slurry, impregnating a support of titanium oxide shaped in a suitable shape with the above described slurry and then drying it.

In this case, vanadium oxide is not always used as a raw material, but any compound capable of being converted into vanadium oxide by a simple oxidation treatment can be used without any problem. The thus prepared catalyst is subjected to a heat treatment in an oxidation atmosphere at a temperature of at least 150° C., preferably 200° to 450° C., whereby the most part of the vanadium compound is converted into the form of oxide. Since a vanadium compound is gradually oxidized during use depending upon the conditions thereof, a previous oxidation treatment can be omitted.

The vanadium compound, which can be used for the production of the catalyst of the present invention, is not particularly limited if it can be converted into vanadium oxide by oxidation. For example, $VOC_2H_4$, $VOCl_3$, $VOSO_4$ and the like can be used and in particular, vanadium oxide and ammonium metavanadate are preferably used.

The amount of the catalytic active component to be supported on a support is generally adjusted to a range of 0.1 to 20 weight % in the form of vanadium oxide. If less than 0.1 weight %, the catalytic activity is too low to be put into practical use, while if more than 20 weight %, the pore distribution of the support is changed and the reinforcing effect by the support is decreased. This is not favourable.

The thus prepared catalyst is charged in a reactor, through which an NOx-containing gas, to which a reducing gas has been added, is passed and reacted to decompose NOx into nitrogen and oxygen. The reducing gas can directly be added to the reactor. The reaction temperature and space velocity (SV) of the gas, depending on the NOx concentration in the gas, the shape and amount of the catalyst used and the shape of the reactor, are preferably adjusted in such a manner that the reaction temperature is in the range of 100° to 350° C., particularly 110° to 350° C. and the space velocity is in the range of 2000 to 20000 $hr^{-1}$. If the reaction temperature is lower than 100° C., the amount of the catalyst required is increased and troubles, e.g. deposition of ammonium nitrate tends to occur, while if higher than 350° C., the energy cost is wasted, which should be avoided. If the space velocity is less than 2000 $hr^{-1}$, the gas-processing capacity is too low to be put to practical use, although the decomposition ratio of NOx is not changed, while if more than 20000 $hr^{-1}$, the decomposition ratio of NOx is lowered, which is not preferable.

Examples of the compound used as a reducing gas source in the method of the present invention include ammonium salts such as ammonium carbonate, ammonium hydrogen carbonate, ammonium formate, ammonium acetate and the like and amino compounds such as urea in addition to ammonia. These compounds can be introduced into a reaction system as they are in the case of gases and in the form of a gas sublimated, a liquid or a solution in the case of solids or liquids.

The catalyst of the present invention is a catalyst having a high decomposing activity of NOx, in particular, a high decomposing activity, which cannot be obtained by the catalyst of the prior art, in a low temperature zone, e.g. at most 170° C., as well as a high selectivity of reactions, and further having less tendency of activity lowering due to a catalyst-poisonous material such as water or SOx. Thus, the catalyst of the present invention is capable of treating an NOx-containing waste gas with coexistent catalyst-poisonous materials such as water, SOx, etc. at a relatively low temperature, e.g. 170° C. or lower, at which no practical treatment can be carried out by the prior art method, in effective manner without side reactions.

EXAMPLES

The present invention will specifically be illustrated by the following examples. In Examples and Comparative Examples, assessment of the properties of the catalysts was carried out by measuring the removal efficiency of NOx and the amount of $N_2O$ formed by the following method:

That is, the removal efficiency of NOx is obtained by filling the central part of a reaction tube with an inner diameter of 50 mm and a length of 50 cm with 40 ml of a catalyst, passing a sample gas having a composition shown in Table 1 at reaction temperatures of 120° C. and 150° C. and a space velocity of 10000 $hr^{-1}$ through the reaction tube and determining the NO concentration at the inlet and outlet of the reaction tube by chemiluminescence. At the same time, the amount of $N_2O$ formed was determined by the TCD gas-chromatography to obtain the yield thereof.

TABLE 1

| Sample Gas | G1 | G2 |
|---|---|---|
| NO (ppm) | 200 | 200 |
| $N_2O$ (ppm) | 0 | 0 |
| $NH_3$ (ppm) | 200 | 200 |
| $SO_2$ (ppm) | 0 | 500 |
| $SO_3$ (ppm) | 0 | 100 |
| $O_2$ (ppm) | 5 | 5 |
| $H_2O$ (%) | 10 | 10 |
| $N_2$ (ppm) | balance | balance |

The pore diameters, pore distributions and pore volumes of the titanium oxide supports and catalysts were obtained by using liquid nitrogen in a BET apparatus.

Examples 1 to 11

An aqueous solution of titanyl sulfate ($TiOSO_4$ content: about 30 weight %) was stirred and hydrolyzed under a condition suitably selected in the range of 90° to 110° C. and 1 to 20 hours. 100 g of the resulting titanium oxide hydrate was washed with 1 liter of water at 80° C., dried in the air at 110° C. for 2 hours and heated and calcined at 350° to 450° C. for 5 hours to prepare a support consisting of titanium oxide of anatase type. This support was crushed, sieved in a size of 5 to 14 meshes and immersed in a saturated aqueous solution of ammonium metavanadate ($NH_4VO_3$) in an amount of 10 times by volume as much as the support for 16 hours. The product was washed with water, dried at about 110° C. for 2 hours, heated and calcined at 350° to 400° C. for 1 hour to thus obtain Catalysts A, B, C, D, E, F, G, H, I, J and K each comprising 10 weight % of vanadium oxide supported on a support of titanium oxide. These production conditions and the properties of the resulting catalysts are shown in Table 2. As to Catalyst B, in particular, the result is shown in FIG. 1.

Using the resulting catalysts, the removal efficiency of NOx and the amount of $N_2O$ formed were measured by the above described method. The measured results after passage of 100 hours are shown in Table 3. It will clearly be understood from these results that sufficient denitrification property can be obtained without formation of by-products such as $N_2O$ even at low temperatures, e.g. 120° C. or 150° C., at which no sufficient denitrification property can be obtained by the prior art catalysts.

Comparative Examples 1 to 3

For the preparation of catalysts, the same raw materials were used and the same procedures were repeated as in Examples to obtain Catalysts L, M and N. The production conditions and properties of the supports are shown in Table 2. Using the resulting catalysts, the removal efficiency of NOx and the amount of $N_2O$ formed were measured in an analogous manner to Examples. The measured results after passage of 100 hours are shown in Table 3.

In Comparative Example 1, the treatment time was longer for the hydrolysis temperature and the pore volumes of 7.5 to 8.5 nm were thus decreased, while in Comparative Example 2, the time was shorter for the hydrolysis temperature and the pore volumes of 1.5 to 2.5 nm and 7.5 to 8.5 nm were thus decreased. In Comparative Example 3, the calcination temperature of the support was higher, e.g. 550° C. and the pore volumes of 1.5 to 2.5 nm were thus decreased. In these Catalysts, moreover, the denitrification property at lower temperatures was worse and $N_2O$ was formed as a by-product.

Comparative Examples 4

30 parts by weight of commercially available titanium oxide of anatase type was mixed with 70 parts by weight of water to prepare a slurry, which was then calcined in the air at a temperature of 420° C. for 5 hours to prepare a support consisting of titanium oxide of anatase type.

This support was crushed, sieved in a size of 5 to 14 meshes and immersed in a saturated aqueous solution of ammonium metavanadate ($NH_4VO_3$) in an amount of 10 times by volume as much as the support for 16 hours. The product was washed with water, dried at about 110° C. for 2 hours, heated and calcined at 400° C. for 1 hour to thus obtain Catalyst P comprising 10 weight % of vanadium oxide supported on a support of titanium oxide. The production conditions and the properties of the resulting catalysts are shown in Table 2.

Using the resulting catalyst, the removal efficiency of NOx and the amount of $N_2O$ formed were measured by the above described method. The measured results after passage of 100 hours are shown in Table 3.

TABLE 2

| Examples & Comparative Examples | Catalyst No. | Preparation of Support | | Calcination | Properties of Support | | | Calcination Temp. of Catalyst (°C.) |
|---|---|---|---|---|---|---|---|---|
| | | Hydrolysis | | | Specific Surface | Pores of 1.5– | Pores of 7.5– | |
| | | Temp. (°C.) | Time (hr) | Temp. (°C.) | Area ($m^2/g$) | 2.5 nm ($m^2/g$) | 8.5 nm ($m^2/g$) | |
| Example 1 | A | 100 | 5 | 350 | 200 | 0.05 | 0.07 | 350 |
| Example 2 | B | 100 | 5 | 450 | 128 | 0.05 | 0.06 | 400 |
| Example 3 | C | 90 | 5 | 400 | 138 | 0.05 | 0.06 | 400 |
| Example 4 | D | 90 | 20 | 400 | 112 | 0.05 | 0.05 | 400 |
| Example 5 | E | 100 | 2 | 400 | 142 | 0.06 | 0.07 | 400 |
| Example 6 | F | 100 | 10 | 400 | 108 | 0.05 | 0.05 | 400 |
| Example 7 | G | 110 | 1 | 400 | 135 | 0.05 | 0.06 | 400 |
| Example 8 | H | 110 | 5 | 400 | 105 | 0.05 | 0.05 | 400 |
| Example 9 | J | 100 | 5 | 380 | 185 | 0.08 | 0.08 | 380 |
| Example 10 | J | 100 | 5 | 380 | 162 | 0.08 | 0.07 | 400 |
| Example 11 | K | 100 | 5 | 400 | 171 | 0.07 | 0.08 | 380 |
| Compararison | | | | | | | | |
| Example 1 | L | 100 | 15 | 400 | 120 | 0.05 | 0.03 | 400 |
| Example 2 | M | 80 | 15 | 359 | 163 | 0.03 | 0.03 | 350 |
| Example 3 | N | 100 | 5 | 550 | 56 | 0.03 | 0.04 | 400 |
| Example 4 | P | — | — | 420 | 112 | 0.01 | 0.06 | 400 |

TABLE 3

| Examples & Comparative Examples | Catalyst No. | Sample Gas | Reaction Temperature 120° C. | | Reaction Temperature 150° C. | |
|---|---|---|---|---|---|---|
| | | | NOx Removal Ratio (%) | $N_2O$ Formation Ratio (%) | NOx Removal Ratio (%) | $N_2O$ Formation Ratio (%) |
| Example 1 | A | G 1 | 85 | not found | >99 | not found |
| | | G 2 | 82 | not found | >99 | not found |
| Example 2 | B | G 1 | 81 | not found | >99 | not found |
| | | G 2 | 79 | not found | >99 | not found |
| Example 3 | C | G 1 | 84 | not found | >99 | not found |
| | | G 2 | 83 | not found | >99 | not found |
| Example 4 | D | G 1 | 87 | not found | >99 | not found |
| | | G 2 | 82 | not found | >99 | not found |
| Example 5 | E | G 1 | 84 | not found | >99 | not found |
| | | G 2 | 78 | not found | >99 | not found |
| Example 6 | F | G 1 | 81 | not found | >99 | not found |
| | | G 2 | 78 | rot found | >99 | not found |
| Example 7 | G | G 1 | 81 | not found | >99 | not found |
| | | G 2 | 77 | not found | >99 | not found |
| Example 8 | H | G 1 | 79 | not found | >99 | not found |
| | | G 2 | 77 | not found | >99 | not found |
| Example 9 | I | G 1 | 92 | not found | >99 | not found |
| | | G 2 | 91 | not found | >99 | not found |
| Example 10 | J | G 1 | 87 | not found | >99 | not found |
| | | G 2 | 84 | not found | >99 | not found |
| Example 11 | K | G 1 | 90 | not found | >99 | not found |
| | | G 2 | 89 | not found | >99 | not found |
| Comparison | | | | | | |
| Example 1 | L | G 1 | 27 | 1 | 47 | 2 |
| | | G 2 | 25 | 1 | 44 | 2 |
| Example 2 | M | G 1 | 23 | 1 | 41 | 3 |
| | | G 2 | 17 | 1 | 35 | 3 |
| Example 3 | N | G 1 | 46 | 1 | 68 | 2 |
| | | G 2 | 42 | 1 | 64 | 2 |
| Example 4 | P | G 1 | 19 | 1 | 39 | 2 |
| | | G 2 | 15 | t | 32 | 2 |

It is apparent from the results of Tables 2 and 3 that Catalysts A, B, C, D, E, F, G, H, I, J and K according to the present invention, each comprising vanadium oxide supported on titanium dioxide of anatase type, and having a specific surface area of 100 to 250 m²/g, a pore volume of at least 0.05 cc/g of micro pores of 1.5 to 2.5 nm in pore diameter and a pore volume of at least 0.05 cc/g of micro pores of 7.5 to 8.5 nm in pore diameter have much higher NOx-decomposing capacity, without substantial lowering of the catalytic activity, even in the presence of SOx, and formation of $N_2O$ as a by-product, as compared with Comparative Catalysts L, M, N and P, each comprising vanadium oxide supported on titanium dioxide of the prior art, differing in pore distribution.

In particular, Catalysts L and M were prepared in an analogous manner to Catalysts A to K, but did not satisfy the requirements of the present invention for the pore distribution, so their properties as the denitrification catalyst were lowered.

As reference data, the specific surface areas and pore volumes of several commercially available titanium dioxides ($TiO_2$) were measured to obtain results as shown in Table 4:

TABLE 4

| Sample | Specific Surface Area (m²/g) | Pores of 1.5–2.5 nm (cc/g) | Pores of 1.5–2.5 nm (cc/g) |
|---|---|---|---|
| Catalyst B (Example 1) | 128 | 0.05 | 0.06 |

TABLE 4-continued

| Sample | Specific Surface Area (m²/g) | Pores of 1.5–2.5 nm (cc/g) | Pores of 1.5–2.5 nm (cc/g) |
|---|---|---|---|
| ①* | 9.18 | ≈0 | ≈0 |
| ②* | 33.7 | ≈0 | 0.01 |
| ③* | 162 | 0.02 | 0.02 |
| ④* | 111 | 0.04 | 0.02 |
| ⑤* | 134 | 0.05 | 0.02 |
| ⑥* | 232 | 0.07 | 0.02 |

(Note)
①*–⑥*: commercially available article

Utility and Possibility on Commercial Scale

The catalyst of the present invention is a catalyst having a high decomposing activity of NOx, in particular, a high decomposing activity, which cannot be obtained by the catalyst of the prior art, in a low temperature zone, e.g. at most 170° C., without forming $N_2O$ as a by-product, and further having less tendency of activity lowering due to a catalyst-poisonous material such as water or SOx. Furthermore, according to the method of the present invention, an NOx-containing waste gas with coexistent catalyst-poisonous materials such as water, SOx, etc. can be treated in effective manner at a relatively low temperature, e.g. 170° C. or lower, at which no practical treatment can be carried out by the prior art method.

What is claimed is:

1. A catalyst for the decomposition of nitrogen oxides in which vanadium oxide is supported on titanium oxide of anatase type, having a specific surface area of 100 to 250 m$^2$/g and micro pores of 1.5 to 2.5 nm in pore diameter and 7.5 to 8.5 nm in pore diameter respectively in an amount of at least 0.05 cc/g.

2. The catalyst for the decomposition of nitrogen oxides, as claimed in claim 1, wherein the supported amount of vanadium oxide is 0.1 to 20 weight %.

3. A process for the production of a catalyst for the decomposition of nitrogen oxides, which comprises hydrolyzing an aqueous solution containing a titanium salt at a hydrolysis temperature of 80° to 120° C. for 0.5 to 25 hours to obtain titanium oxide hydrate, calcining the titanium oxide hydrate at a calcination temperature of 300° to 500° C. for 1 to 5 hours to obtain titanium oxide of anatase type having a specific surface area of 100 to 250 m$^2$/g and micro pores of 1.5 to 2.5 nm in pore diameter and 7.5 to 8.5 nm in pore diameter respectively in an amount of at least 0.05 cc/g, and supporting vanadium oxide on the resulting titanium oxide.

4. The process for the production of a catalyst for the decomposition of nitrogen oxides, as claimed in claim 3, wherein the supporting of vanadium oxide is carried out by the use of a compound capable of being converted into vanadium oxide by oxidation.

5. The process for the production of a catalyst for the decomposition of nitrogen oxides, as claimed in claim 3 or claim 4, wherein the amount of vanadium oxide supported on the resulting titanium oxide is 0.1 to 20 weight %.

6. The process for the production of a catalyst for the decomposition of nitrogen oxides, as claimed in claim 3 or claim 4, wherein the supporting of vanadium oxide is carried out in the presence of at least one binder component selected from the group consisting of colloidal silica, colloidal titania and colloidal alumina.

7. A method for a denitrification of a waste gas comprising contacting a nitrogen oxide-containing waste gas with the catalyst, obtained by supporting vanadium oxide on titanium oxide of anatase type, having a specific surface area of 100 to 250 m$^2$/g and micro pores of 1.5 to 2.5 nm in pore diameter and 7.5 to 8.5 nm in pore diameter respectively in an amount of at least 0.05 cc/g, in the presence of a reducing gas at a temperature of 100° to 350° C.

8. The method for the denitrification of a waste gas, as claimed in claim 7, wherein the contacting of the catalyst is carried out at a space velocity of 2000 to 20000 hr$^{-1}$.

9. The method for the denitrification of a waste gas, as claimed in claim 7 or claim 8, wherein the reducing gas is ammonia.

10. The method for the denitrification of a waste gas, as claimed in claim 9, wherein as the ammonia source, there is used at least one member selected from the group consisting of ammonium carbonate, ammonium hydrogen carbonate, ammonium formate, ammonium acetate and urea.

11. The process for the production of a catalyst for the decomposition of nitrogen oxides, as claimed in claim 5, wherein the supporting of vanadium oxide is carried out in the presence of at least one binder component selected from the group consisting of colloidal silica, colloidal titania and colloidal alumina.

\* \* \* \* \*